(12) United States Patent
Yao et al.

(10) Patent No.: US 10,692,480 B2
(45) Date of Patent: Jun. 23, 2020

(54) SYSTEM AND METHOD OF READING ENVIRONMENT SOUND ENHANCEMENT BASED ON IMAGE PROCESSING AND SEMANTIC ANALYSIS

(71) Applicants: Harbin Institute of Technology, Shenzhen, Shenzhen, Guangdong (CN); Yunjiang Lou, Shenzhen, Guangdong (CN)

(72) Inventors: Shunjie Yao, Shenzhen (CN); Wudan Lou, Shenzhen (CN); Yunjiang Lou, Shenzhen (CN); Yujing Chen, Shenzhen (CN)

(73) Assignees: Harbin Institute of Technology, Shenzhen (CN); Yunjiang Lou (CN)

( * ) Notice: Subject to any disclaimer, the term of this patent is extended or adjusted under 35 U.S.C. 154(b) by 0 days.

(21) Appl. No.: 16/469,774

(22) PCT Filed: Jun. 6, 2017

(86) PCT No.: PCT/CN2017/087228
§ 371 (c)(1),
(2) Date: Jun. 14, 2019

(87) PCT Pub. No.: WO2018/201548
PCT Pub. Date: Nov. 8, 2018

(65) Prior Publication Data
US 2020/0135158 A1    Apr. 30, 2020

(30) Foreign Application Priority Data

May 2, 2017    (CN) .......................... 2017 1 0302291

(51) Int. Cl.
*G10H 7/00*    (2006.01)
*G06F 40/30*    (2020.01)
(Continued)

(52) U.S. Cl.
CPC ............. *G10H 7/008* (2013.01); *G06F 16/36* (2019.01); *G06F 16/635* (2019.01);
(Continued)

(58) Field of Classification Search
CPC ... G10L 15/04; G10L 2015/025; H04N 5/225; H04N 21/23418; H04N 21/4223;
(Continued)

(56) References Cited

U.S. PATENT DOCUMENTS

| 5,918,222 A * | 6/1999 | Fukui ..................... G06Q 10/10 |
| 7,996,753 B1 * | 8/2011 | Chan .................. G06Q 30/0263 |
| | | 715/200 |

(Continued)

FOREIGN PATENT DOCUMENTS

| CN | 103782342 A | 5/2014 |
| CN | 104166689 A | 11/2014 |

(Continued)

*Primary Examiner* — Marlon T Fletcher
(74) *Attorney, Agent, or Firm* — Boyle Fredrickson, SC (57) ABSTRACT

The disclosure relates to a system and a method for disposing background music and sound effects based on image processing and semantic analysis. The method includes determining the environment and emotional attributes of a text semantics in a reading page by analyzing and processing an acquired reading page image, and selecting music and sound material to synthesize reading background music and sound effects according to the text semantics, so as to achieve sound enhancement in the reading environment. The system includes an image acquisition device for acquiring a reading image of a user, and a processing device having an operation unit for performing the method.

11 Claims, 9 Drawing Sheets

(51) Int. Cl.
*G06K 9/20* (2006.01)
*G06K 9/46* (2006.01)
*G06T 5/00* (2006.01)
*G06K 9/00* (2006.01)
*G06F 16/635* (2019.01)
*G06F 16/68* (2019.01)
*G06F 16/36* (2019.01)
*G10K 15/02* (2006.01)

(52) U.S. Cl.
CPC ............ *G06F 16/686* (2019.01); *G06F 40/30* (2020.01); *G06K 9/00442* (2013.01); *G06K 9/20* (2013.01); *G06K 9/46* (2013.01); *G06T 5/002* (2013.01); *G10K 15/02* (2013.01); *G06K 2209/01* (2013.01); *G10H 2210/021* (2013.01); *G10H 2210/155* (2013.01)

(58) Field of Classification Search
CPC ......... H04N 2201/0084; H04N 9/8715; H04N 19/136; G06K 9/4671; G06K 9/00711; G06T 19/006; G06T 2207/10016; G06T 7/292; G10H 7/00; G10H 1/0025; G10H 2210/005; G10H 2210/021; G10H 2240/135; G10H 2240/141; G09B 17/00; G09B 5/02; G09B 5/065
See application file for complete search history.

(56) References Cited

U.S. PATENT DOCUMENTS

| | | | |
|---|---|---|---|
| 2005/0289111 A1* | 12/2005 | Tribble | ............. G06F 16/90335 |
| 2010/0063880 A1* | 3/2010 | Atsmon | ............. G06Q 10/0637 |
| | | | 705/14.53 |
| 2014/0142954 A1 | 5/2014 | Cameron et al. | |
| 2014/0143642 A1 | 5/2014 | Cameron et al. | |
| 2014/0156046 A1 | 6/2014 | Cameron et al. | |
| 2014/0223462 A1* | 8/2014 | Aimone | ................. G16H 40/67 |
| | | | 725/10 |
| 2017/0244928 A1* | 8/2017 | Miyajima | ............ H04N 5/9201 |
| 2017/0358320 A1 | 12/2017 | Cameron et al. | |
| 2018/0032305 A1* | 2/2018 | Cameron | ................. G10L 25/63 |
| 2018/0226063 A1* | 8/2018 | Wood | ................... G11B 27/031 |

FOREIGN PATENT DOCUMENTS

| | | |
|---|---|---|
| CN | 104991708 A | 10/2015 |
| CN | 105335455 A | 2/2016 |
| CN | 107169430 A | 9/2017 |
| CN | 207115329 U | 3/2018 |
| EP | 2737481 A | 6/2014 |
| WO | 2013015694 A1 | 1/2013 |

* cited by examiner

SYSTEM AND METHOD OF READING ENVIRONMENT SOUND ENHANCEMENT BASED ON IMAGE PROCESSING AND SEMANTIC ANALYSIS

CROSS-REFERENCE TO RELATED APPLICATIONS

This application is a national phase application under 35 U.S.C. 371, claiming priority to PCT Application No. PCT/CN2017/087228, filed Jun. 6, 2017 and titled, READING ENVIRONMENT SOUND-EFFECT ENHANCEMENT SYSTEM AND METHOD BASED ON IMAGE PROCESSING AND SEMANTIC ANALYSIS, which, in turn, claims priority to Chinese Application No. CN 201710302291.3, filed May 2, 2017, the entire contents of each application is incorporated herein by reference.

FIELD

The disclosure relates to a system and a method for disposing background music and sound effects based on image processing and semantic analysis, and more particularly to a method including determining the environment and emotional attributes of a text semantics in a reading page by analyzing and processing an acquired reading page image, and selecting music and sound material to synthesize reading background music and sound effects according to the text semantics, so as to achieve sound enhancement in the reading environment.

INTRODUCTION

Reading literary works, magazines, and newspapers with appropriate background sounds and music can enhance the sense of live experience and improve reading efficiency. Stimulating the brain with soothing rhythmic music can eliminate psychological stress, improve concentration and enhance brain vitality for a user. If listening classical music with slow rhythm, the reader's memory can be increased by 50%; and if matching the scene music or sound effect according to the content of an article, the reader can also have an impressive reading experience.

Regarding the selection of a reading background music, an existing method includes establishing a reading library and a background music library, manually determining the corresponding background music tracks according to the overall content of the reading in advance, and establishing the correspondence between the readings and the background music tracks. Once a reader chooses a certain reading material to read, a system automatically extracts the corresponding background music and plays it. The disadvantages of this system lie in that: firstly, due to limited amount of readings in the library, the reader can't get a background music for the readings that are not in the library; secondly, the system can only provide a limited amount of background music, but cannot provide the sound effect that reflects the environment and scene features, therefore lacking immersion; and thirdly, because the music tracks only match the overall content of the reading material, the music may not adapt to the reading situation or even contradict the reading situation in specific chapter. Accordingly, the existing software and hardware products for reading background music systems still have deficiencies that the real-time scenes and emotions of the reading content cannot be determined from the words recognized in real-time, and the sound effect and music reflecting the scene and emotion of the reading content cannot be provided, resulting in common or even poor reading experience and immersive.

SUMMARY

The disclosure provides a system and a method of reading environment sound enhancement based on image processing and semantic analysis, which match scene sound effects and emotional music according to real-time reading content, and generate appropriate background music with sound effects by means of audio synthesis and enhancement, so as to greatly improve readers' immersive reading experience.

According to an aspect of the disclosure, the technical solution concerns a reading environment sound enhancement system based on image processing and semantic analysis, including an image acquisition device and a processing device. The image acquisition device is configured to acquire an image of the user's real-time reading content. The processing device includes a transmission unit, a memory unit, and an audio unit, and an operation unit for controlling the transmission unit, the memory unit, and the audio unit to perform transmission, memory, and audio synthesis, respectively. The operation unit includes: an image extraction module configured to receive an input signal of the image acquisition device, and then to convert the image into an image signal; and a word recognition module configured to process the image signal to make it clear and easy to recognize, and to identify by the image signal. The recognized word is stored in a cached text file, and classifies the word in the text file. The semantic analysis module is used to identify the semantics of the classified word, to extract the environmental semantic words and the emotional semantic words respectively, and then to retrieve an environmental background music or an emotional background music by comparing the environmental semantic words or the emotional semantic words to an element in a background music library. The audio synthesis module is configured to perform audio synthesis and sound enhancement on the basis of the background music.

Further, the image acquisition device includes a camera and/or a text capturing tool of a smart reading device, and the text capturing tool includes a screenshot tool, a text memory reading tool or an invoking tool of an application programming interface (API) for a reading application.

Further, the image acquisition device is attached to an earphone, glasses or a wearable device of the user by at least one accessory.

Further, the system further includes a second operation unit disposed in the image acquisition device, wherein the second operation unit includes: an image preprocessing module configured to perform calibration of a reading target area on the captured image, and to perform interception, correction, denoising, and binarization processing for the image in the reading target area; and a transmission module configured to compress and wirelessly transmit the preprocessed image.

Further, the semantic analysis module includes: a word slicer configured to invoke a statistical language model to divide at least one word in a text segment, and to calculate a weight value and an emotion score for each divided word; a topic model solver configured to calculate an optimal solution of an implicit Dirichlet LDA topic model by a random sampling method to represent a classification of each divided word; and a word feature extractor configured to classify the words in a text string and to distinguish the environmental words and the emotional words in the text string.

Further, the audio synthesis module includes: a time domain recorder for recording at least one reading time node according to a text change in a reading target area of the acquired image, recording at least one emotional time node if the accumulated emotional score value exceeds a preset threshold, each emotional time node corresponding to a position of the emotional word in the text segment, and generating a time domain control bar by integrating the reading time node and the emotional time node; and a mixer for superimposing audio signals of the background music and the sound effect music in time domain by a saturator having an attenuation factor, by means of the time domain control bar.

According to another aspect of the disclosure, a reading environment sound enhancement method based on image processing and semantic analysis, including the following steps:

S1, providing a semantic knowledge base (SKB) including a background semantic set, the background semantic set including an environment semantic set and an emotional semantic set, each of the environmental semantic set and the emotional semantic set including condition words;

S2, receiving an input signal and converting image information from the input image signal including a screenshot in an electronic device or a page shooting image of a paper book;

S3, processing the image signal for clear and easy recognition, identifying the word from the image signal, storing the recognized word in a cached text file, and classifying the word in the text file;

S4, identifying the semantics of the classified word, and extracting environmental semantic words and emotional semantic words respectively;

S5, retrieving an environmental background music or an emotional background music by comparing the environmental semantic words or the emotional semantic words to an element in a background music library;

S6, performing audio synthesis and sound enhancement on the basis of background music, and playing the synthesized audio by the audio output device.

Further, the step S3 further includes: processing the image signal including image correction and denoising, and identifying the word including text refinement, connected domain digitization, and line segment linearization.

Further, the step S5 further includes: invoking a statistical language model to divide at least one word in a text segment, and calculating a weight value and an emotion score for each divided word; calculating an optimal solution of an implicit Dirichlet LDA topic model by a random sampling method to represent a classification of each divided word; classifying the words in a text string, and distinguishing the environmental words and emotional words in the text string; and matching a music material to each divided word with a condition word.

Further, the step S6 further includes: recording at least one reading time node according to a text change in a reading target area of the acquired image, and recording at least one emotional time node if the accumulated emotional score value exceeds a preset threshold, each emotional time node corresponding to a position of the emotional word in the text segment; generating a time domain control bar by integrating the reading time node and the emotional time node; and superimposing audio signals of the background music and the sound effect music in time domain by a saturator having an attenuation factor, by means of the time domain control bar.

Beneficial effects of the present disclosure lie in that: the reading environment sound enhancement system and method, by means of image recognition, word classification and scene keyword analysis, can match sense sound and mood music in real-time according to the specific content of current reading; the matched sound or music is synthesized to the background music by audio synthesis and enhance, and played by the audio output device, so as to provide interest, immersive reading experience, and deepen understanding for the reader; and the recognition accuracy and the real-time performance of reading and sound synchronization are improved by adopting the semantic recognition based on the machine learning and the improved superposition remix mode according to time domain.

DETAILED DESCRIPTION OF THE EMBODIMENTS

The present disclosure will be explained below in more detail with reference to the accompanying drawings.

Figure 1:
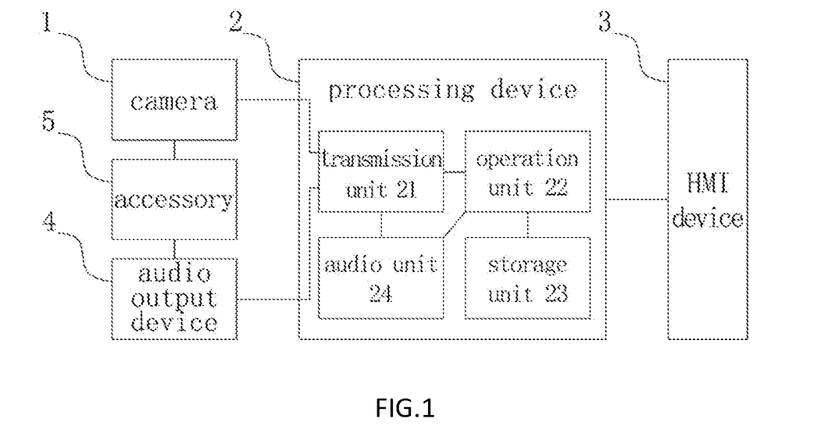
FIG. 1 shows a schematic block diagram of the system according to the present disclosure.

Referring to FIG. 1, in an embodiment, a system according to the present disclosure can include a camera 1, a processing device 2, a human-machine interaction (HMI) device 3, and an accessory 5. The audio output device 4 can be included in the system or can be a separate device provided by the user himself. The processing device 2 includes a transmission unit 21 for connection to the camera 1 and the audio output device 4, a memory unit 23 for storing data, an audio unit 24 for performing audio synthesis and sound enhancement, and an operation unit 22 respectively connected to the transmission unit 21, the memory unit 23 and the audio unit 24.

Preferably, the transmission unit 21 connects to the camera 1 and the audio output device 4 via an internal transmission line or Bluetooth. The memory unit 23 for providing operational memory support and storing music files includes a RAM, a ROM, or any known memory device. The audio unit 24 can be implemented as an audio decoding/encoding chip. The operation unit 22 can be implemented as a low power type micro processing chip. The user can input an instruction and obtain the operation information of the processing device 2 by means of the HMI device 3. The accessory 5 is used to orient the camera 1 to the reading direction and to support the audio output device 4. Some examples of the accessory 5 can be made reference to CN Patent Application No. 201720306109.7 filed by the present applicant, which is herein incorporated by reference.

Figure 2:
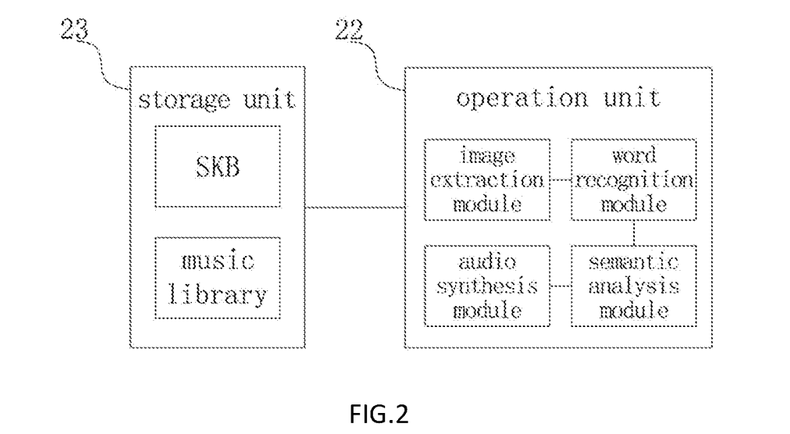
FIG. 2 shows a further schematic block diagram of the system according to the present disclosure.

With further reference to FIG. 2, the memory unit 23 stores a semantic knowledge base (SKB) including a music library containing files of background music and sound effect music. The operation unit 22 includes: an image extraction module for receiving an input signal of the camera and then converting it into an image signal; and a word recognition module configured to process the image signal for clear and easy recognition, to identify the word from the image signal, to store the recognized word in a cached text, and to classify the word in the text file; a semantic analysis module configured to identify the semantics of the classified word, to extract environmental semantic words and emotional semantic words respectively, and to retrieve an environmental background music or an emotional background music by comparing the environmental semantic words or the emotional semantic words to an element in a background music library; and an audio synthesis module for audio synthesis and sound enhancement on the basis of background music.

Figure 3:
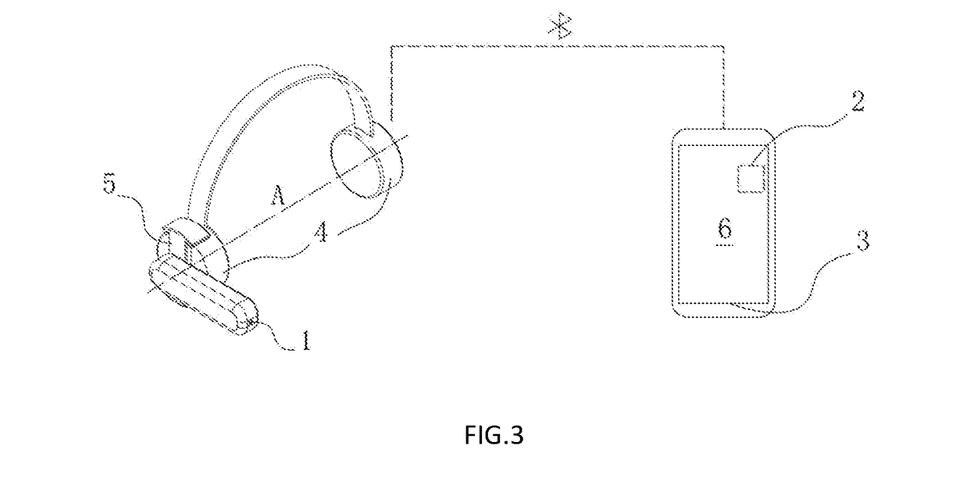
FIG. 3 shows one embodiment of the system according to the disclosure.
Figure 4:
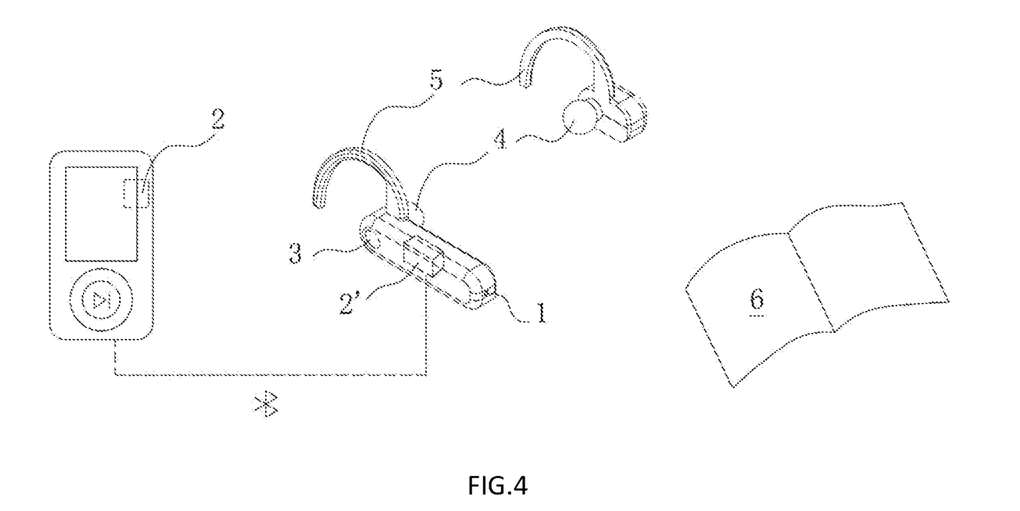
FIG. 4 shows another embodiment of the system according to the disclosure.
Figure 5:
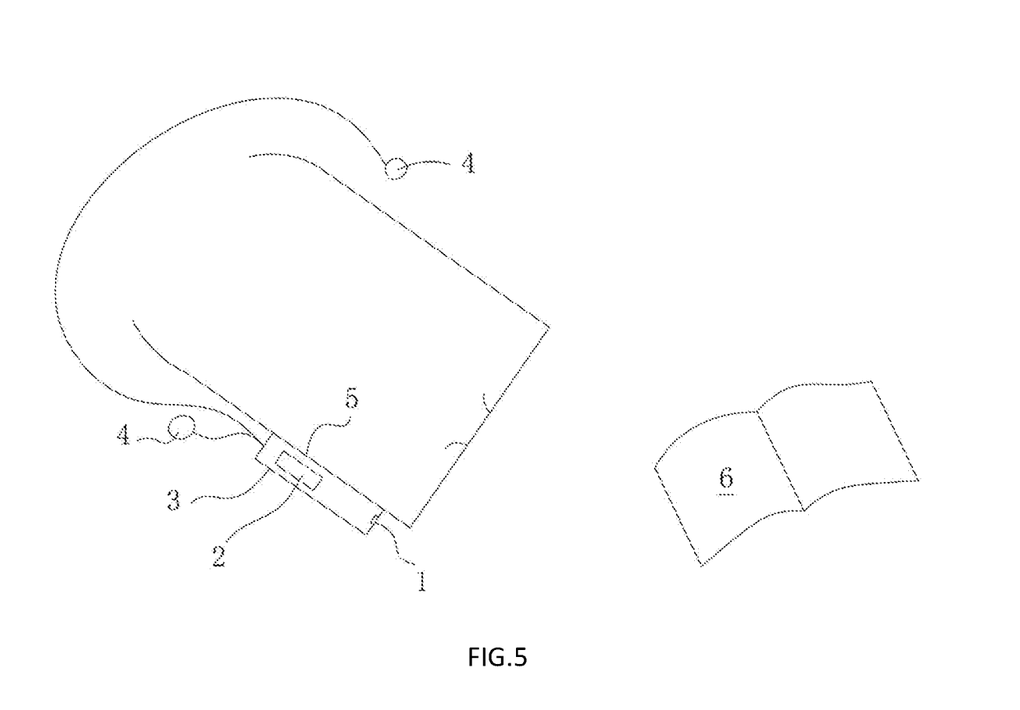
FIG. 5 shows another embodiment of the system according to the disclosure.

FIGS. 3 to 5 show some specific embodiments for the system according to the present disclosure. The reading medium 6 can be a paper medium, a smart phone, an e-ink reader (such as Amazon's Kindle reader) or the like. Accordingly, the processing device 2 can be integrated in the reader, or at least a part of the processing device 2 can be integrated in the image acquisition device. For example, a second operation unit can be provided in the image acquisition device for performing calibration of the read target area on the captured image, and subsequently intercepting, correcting, denoising, and binarizing the image in the reading target area. It is convenient that the pre-processed image can be greatly compressed in size for wireless transmission by Bluetooth or the like.

Figure 6:
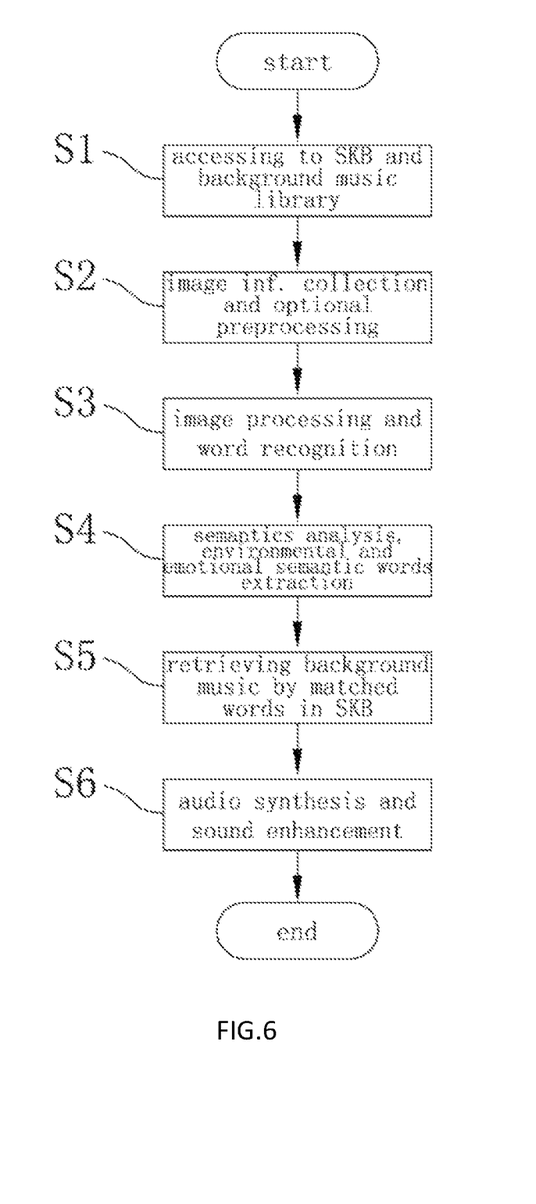
FIG. 6 shows a flow chart of the method according to the disclosure.

FIG. 6 shows a flow chart of the method according to the disclosure, including the following steps:

S1, providing a SKB including a background semantic set, the background semantic set including an environment semantic set and an emotional semantic set, each of the environmental semantic set and the emotional semantic set including condition words;

S2, receiving an input signal and converting image information from the input image signal including a screenshot in an electronic device or a page shooting image of a paper book;

S3, processing the image signal for clear and easy recognition, identifying at least one word from the image signal, storing the recognized word in a cached text file, and classifying the word in the text file;

S4, identifying the semantics of the classified text, and extracting the environmental semantic words and the emotional semantic words respectively;

S5, retrieving an environmental background music and an emotional background music by comparing the environmental semantic words or the emotional semantic words to an element in a background music library; and S6, performing audio synthesis and sound enhancement on the basis of the background music, and playing the synthesized audio by the audio output device.

In step S1, "providing a SKB" is specifically described as follows.

Figure 7:
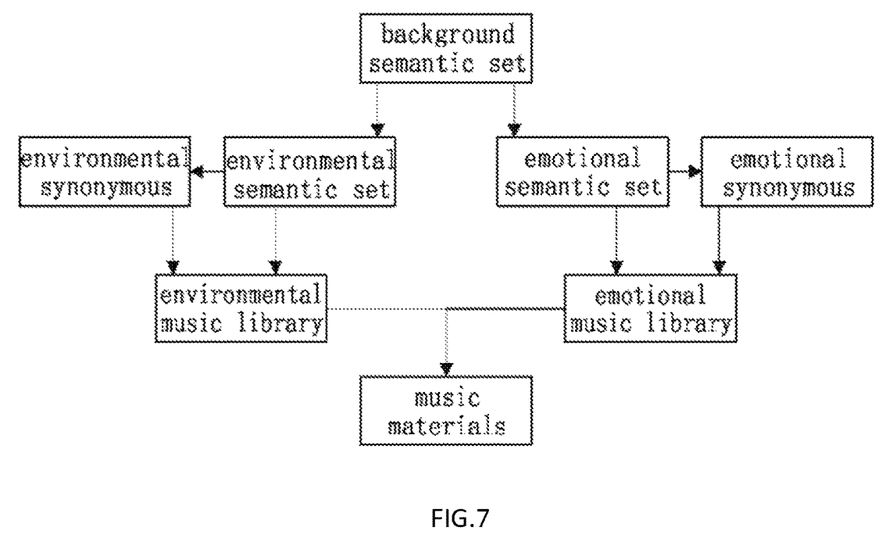
FIG. 7 is a block diagram of a semantic knowledge base in an embodiment of the method according to the present disclosure.

In order to build a reading environment sound adjusting system based on image processing and semantic analysis, it is very important to accurately model and recognize the word representation concept in the SKB, as shown in FIG. 7. A complete process of the modeling should at least include: word classification of background semantic set, classification of approximate and synonymous words, classification of music materials, and matching music material corresponding to the word semantic.

The background semantic set includes an environmental semantic set and an emotional semantic set. The environmental semantic set stores some context-related conditional words, such as time, place, person, voice, d weather, and the word which can effectively reflect the background condition in the current determination. The voice can include animal sound, vocal background sound, etc. The weather includes thunder, rain, etc. The emotional semantic set stores some emotionally related conditional words, such as happiness, passion, tension, fear, etc.

To expand the matching range, the classification of approximate and synonymous words is applied to the library of the environmental semantic set and the emotional semantic set. Approximate and synonymous words are stored correspondingly in the library for certain entry of the approximate and synonymous words. For example, in the environmental semantic set, there is an entry of sea representing to the current sea environment, corresponding to which the synonymous words, such as mid-ocean, ocean, etc., and the approximate words, such as seaside, beach, etc., are stored in the approximate and synonymous words library. In the emotional semantic set, there is an entry of pleasure representing to the current happy mood, corresponding to which the synonymous words, such as happy, pleasant, etc., and the approximate words such as cheerful, joyful, etc., are stored in the corresponding library.

After the classification for the environmental semantic set and the emotional semantic set, the music material is classified in the background semantic set according to the characteristics of the music.

For an actual system, it is difficult to build a complete SKB. In the disclosure the building method generally includes two steps of: (1) establishing a simplified model to achieve the formation of the background semantic set; and (2) training and matching the meaning of unidentified words in the vocabulary by means of machine learning method on line, so as to re-expand the background semantic set.

In step S2, "receiving the input image signal" is specifically described as follows.

Figure 8:
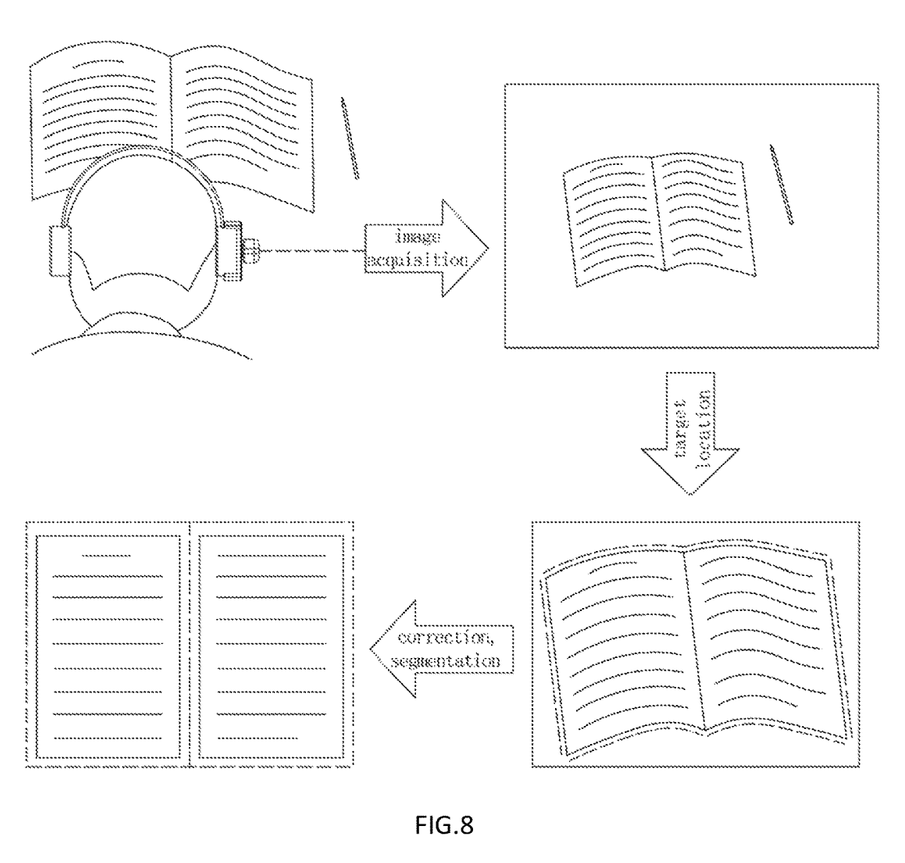
FIG. 8 shows a schematic illustration of image acquisition and pre-processing process in an embodiment of the method according to the present disclosure.

The received input signal is an image signal. The image signal includes screen image data of an e-book reading device or shooting image data of a paper book. Specifically, the image of the e-book reading device can be obtained by means of a screenshot, and the image of the paper book can be acquired by a camera. Image data is received from a camera, a mobile phone, or an electronic reading device, and is preprocessed to a regular image, as shown in FIG. 8. The basic targets for the preprocessing lie in: (1) image correction allowing the reading line in the image is horizontal; (2) image binarization; and (3) removing noise as much as possible.

In step S3 "word recognition" is specifically described as follows.

Figure 9:
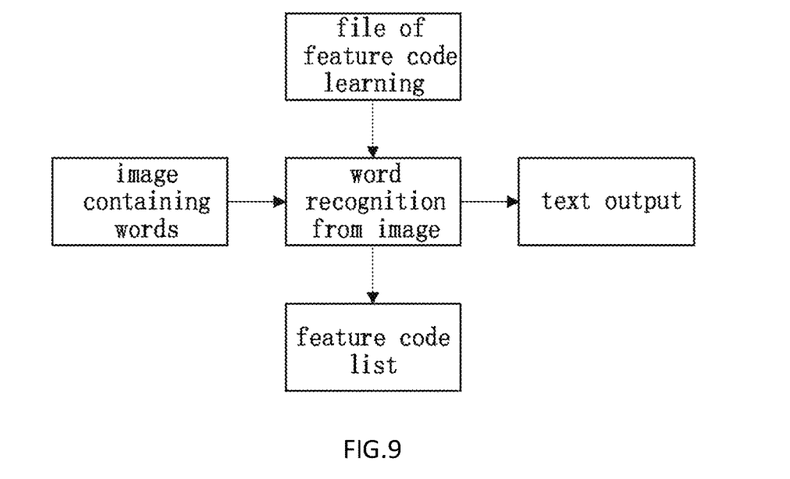
FIG. 9 shows a schematic illustration of a text recognition process in an embodiment of the method according to the present disclosure.

FIG. 9 shows a process of the word recognition. The feature code calculation of the character stroke scanning directly affects the recognition rate and is the core part of the recognition process. Once the feature code is calculated and processed, the word code corresponding to the feature code in the library is directly retrieved, and the text with the words can be output.

By means of an algorithm of textual geometric feature scanning, the feature of the word can be calculated in depth. The method for the algorithm is described as follows.

(1) CHARACTER REFINEMENT PROCESS. It includes adding the width of pixels one by one to represent the character strokes in the image, and acquiring the skeleton of the character. The first step of the feature code scanning is to refine the character and acquire the skeleton of the character, wherein the width of pixels one by one to represent the character stroke in the image. In the refinement algorithm, the pixels of the original character image edge are further to removed layer by layer, without changing the overall skeleton and the stroke connectivity of the character. In the disclosure, the refinement algorithm can be Zhang's mature refinement algorithm in prior art. In Zhang's algorithm, the foreground color pixel is set to 1, and the background color pixel is set to 0. The relationship between a pixel and the surrounding pixels presents a nine-element square, in which a boundary node is defined as P1, and 8 node s around the boundary node are defined as P2-P9. It is apparent that there must be at least one zero color pixel in the surrounding nodes if the boundary node is a pixel at the critical edge of the character. The image processed by Zhang's algorithm only leaves the character skeleton connected by single pixels.

(2) DIGITIZING PROCESS OF THE CONNECTION DOMAIN. It means providing numerical representation for the coordinate, the direction, and the relationship of the adjacent point in the acquiring character image block with single pixel width.

(3) LINEARIZATION FOR LINE SEGMENTS. After the above process, in the image block there appears a lot of line segments. Due to the refinement algorithm or the like, a stroke of a long horizontal line maybe divided into several small line segments. For easier formulation of the feature code, these small and broken line segments are adjusted and integrated into a straight line.

(4) FEATURE CODE CALCULATION. The feature code including a set of values represents the structure of the current glyph of the character with. After the line segment linearization process, the texture of the character is very clear, and the feature code can be calculated more easily.

Figure 10:
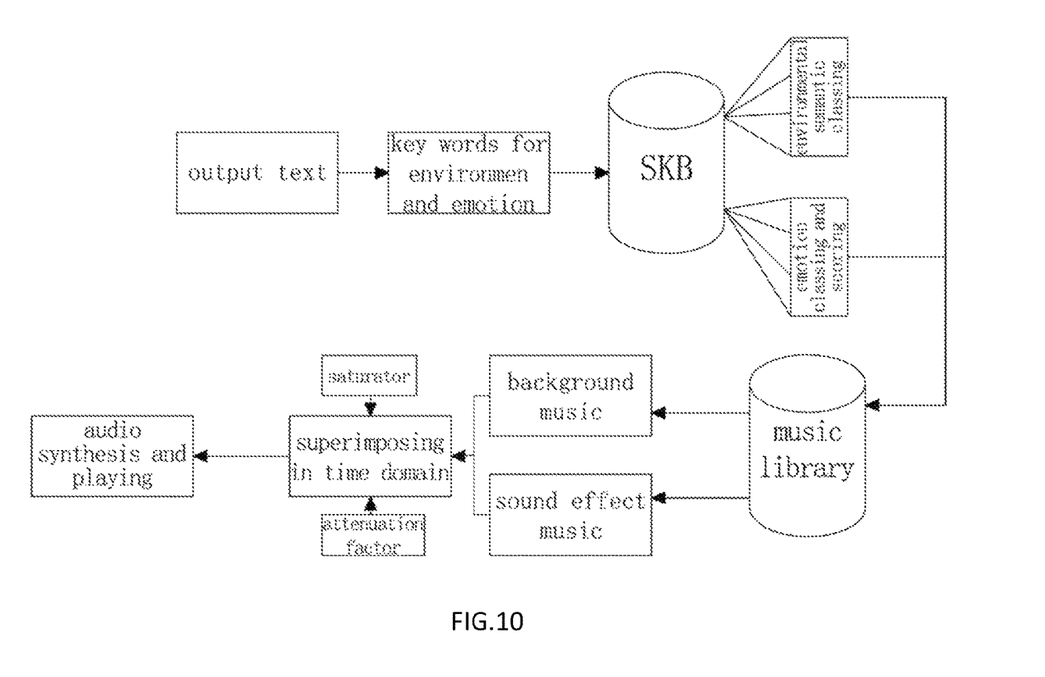
FIG. 10 shows a schematic illustration of a process from word extraction to audio synthesis in an embodiment of the method according to the present disclosure.

Now referring to FIG. 10, in step S4, the "semantic identifying" is specifically described as follows.

The semantic analysis includes two parts: a text basic process and a text semantic analysis, which are described as follows.

(1) Text Basic Process

After acquiring a paragraph of text, usually, the text is divided to several words firstly by use of a full division method. The method includes firstly dividing all words capable of matching the elements in the word library are divided, and secondly determining an optimal division result by means of a statistical language model. It is beneficial that the ambiguity problem can be solved in the words division. In the following example as shown, with regard to a text string "Dameisha Beach, Shenzhen City", the method includes matching all entries and finding all words (such as, City, Shenzhen City, Shenzhen; Beach, Dameisha, Damei, Mei, sand, sea) under the entries in the text string, in form of word grid; finding an optimal path based on the statistical language model n-gram; and renaming the identified entity if necessary. According to the score of the language model of "Dameisha Beach, Shenzhen City", the set of P (Shenzhen City, Dameisha, Beach) having the highest score is the best division.

After the division of text, it is necessary to calculate a weight for each terminal of the result with the divided word(s), and allot a higher weight to the important terminal. The weights can be predicted by means of a supervised machine learning method. The process here is similar to a classification task of machine learning, including predicting a score of [0, 1] for each terminal of the text string and determining a terminal more importance based on the larger weight. Since there is supervised machine learning, training data is needed. Since manual labeling is very labor-intensive, a method of self-extraction of training data can be implemented by a program automatically to mine data from the search log. The labels for the important terminal labeling from the implied user are extracted from a large amount of log data, and the obtained training data will be integrated with the "labeling result" of the billion-level user, covering a wider range of real search data. Therefore the training result is close to the labeled target set, and the training data is more accurate.

Keyword extraction of a short text string is after the short text string is divided. For example, the keyword having a terminal weight can be extracted from the short text string by means of the terminal weight method above, as triggering a threshold.

(2) Text Semantic Analysis

After dividing the word and calculating the weight of the importance in a text string, a process of high-level semantic analysis begins, which includes a topic model determination and a text classification. The topic model is based on the optimal solution of the implicit Dirichlet model (LDA) topic model in the Gibbs Sampling method, wherein the optimal solution represents the classification of words. Subsequently, in the text classification, the trained word feature extractor is used to classify the words in the text string, and extract the environmental words and emotional words in the text string.

In step S5 "music material matching" is specifically described as follows.

The statistic of common scene words and common emotion description words are conducted by a statistical feature-based method, and the keywords in the text are extracted by literally matching. The matching operation can have three types of: (1) accurate matching, wherein the matching condition is that the extracted keyword in step S4 is successfully matched with the entry in the background semantic set only if the matching value is completely identical; (2) phrase matching, wherein the matching condition is that the keywords extracted in step S4 are matched with the approximate or synonym entries in the background semantic set (inverted, synonymous, etc.) (for example, if the key entry is "sea", the words such as "on the sea", "in the sea", "in ocean" can match the entry, then the music of the sea regarding to the "sea" entry is selected as the reading background music); and (3) wide matching, wherein the keyword only need to be highly correlated with the entry in the scope of selection (for example, the word "shark" will be directly related to the background entry of "sea").

According to the correlation between the background semantic set built in step S1 and the corresponding music material library, the corresponding environmental music material and emotional music material can be retrieved.

In step S6 "Audio Synthesis and Sound Effect Enhancement" is specifically described as follows.

The characteristics of audio signal process are as follows. (1) Audio is a time-dependent continuous media, therefore the audio processing is very important in real-time. If there is a delay of 25 ms, one will feel intermittent. (2) The ideal synthetic sound should be stereo. Since the human receives sound with two channels (i.e., left ear, right ear), the computer analog natural sound should also have two channels for stereo. (3) Since the audio signal is not only a carrier of the sound but also include the emotion and other information therein, it requires an extraction of other information such as semantics in the processing of the audio signal.

In practice, there are there types of audio mixing solutions. (1) Time domain superimposed mixing. This type of mixing solution directly superimposes a plurality of audio signals in time domain, but the digital audio signal has a problem of quantization at upper and lower limits, which is easy to cause overflow. (2) Overflow detection mixing. In this type of mixing solution a saturator is used on the basic of time domain superposition. When the detected signal exceeds the upper limit, the output is set to the upper limit. When the lower limit is exceeded, the output is set to the lower limit. However, the original time domain characteristics and the continuity of the audio signal are destroyed, so that the bursting sound and the audio discontinuity appear. (3) Improved solution of time domain superposition. In the solution, an attenuation factor is added based on the time domain superimposed mixing, wherein n is the number of aliased audio stream. This solution can ensure that the aliased audio signal does not overflow. Subsequently, on the basic of the music material retrieved in step S5, the audio synthesis is performed by the improved solution of time domain superposition.

Figure 11:
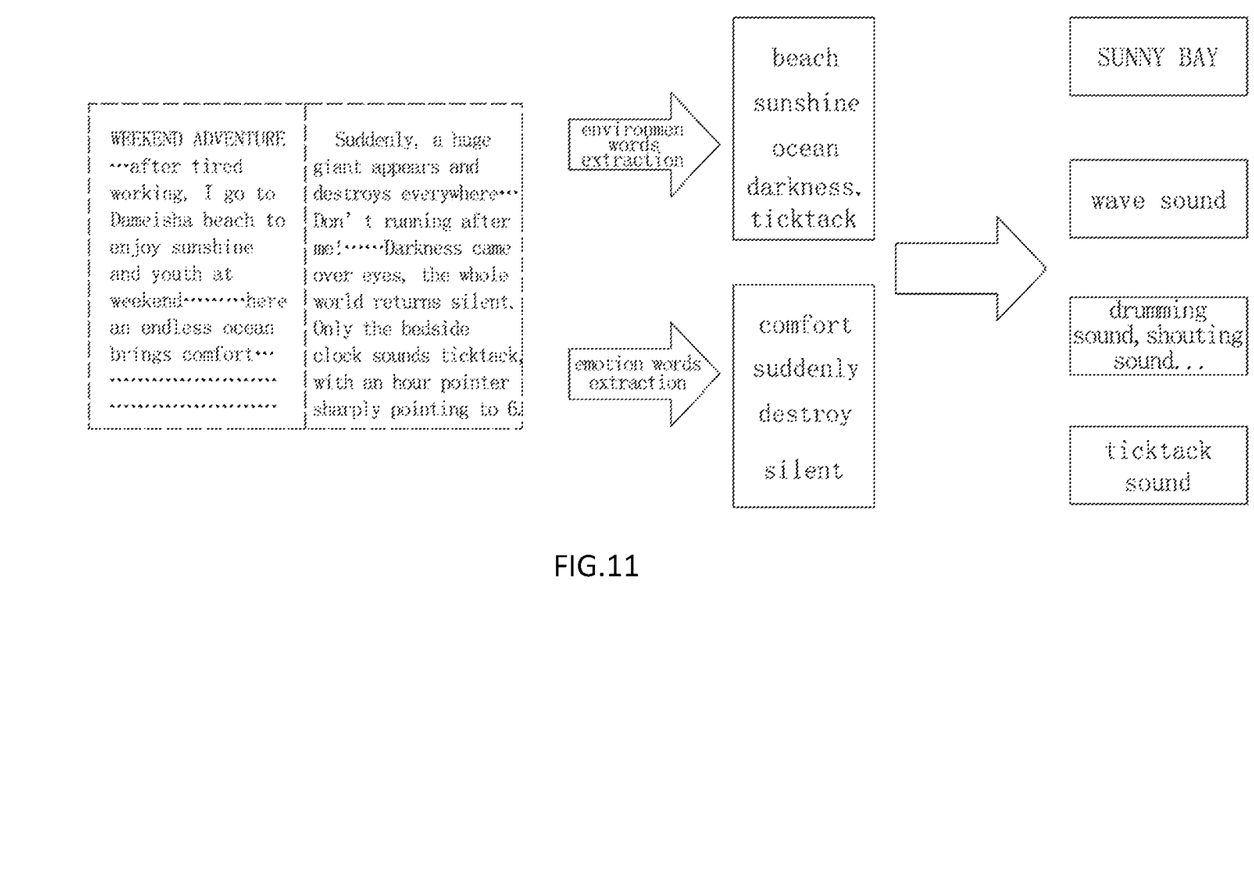
FIG. 11 shows a schematic illustration of a word extraction process in an embodiment of the method according to the present disclosure.

FIG. 11 shows an embodiment of the word acquiring process according to the method of the present disclosure. The time domain control and audio synthesis process in the present disclosure are exemplified below with the background words and emotional words identified from the article as shown.

Figure 12:
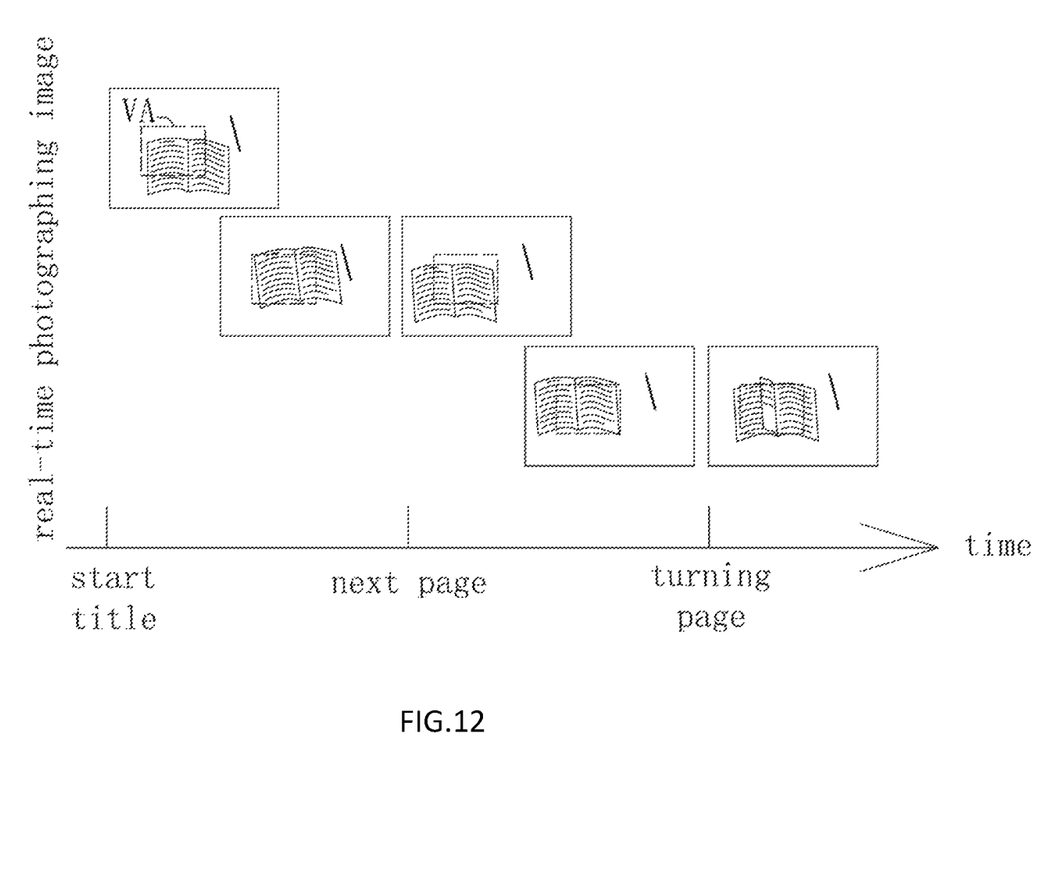
FIG. 12 illustrates one process of generating a read time node in embodiments of method according to the present disclosure.
Figure 13:
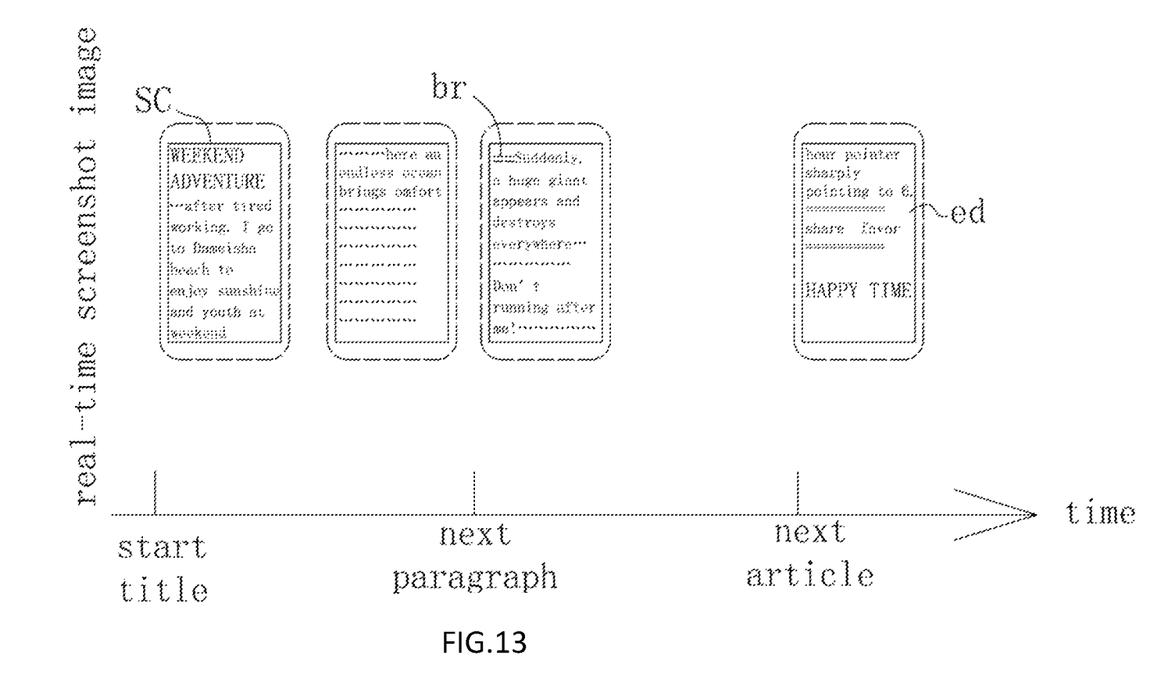
FIG. 13 illustrates another process of generating a read time node in embodiments of method according to the present disclosure.

FIGS. 12 and 13 show embodiments of the process of generating read time nodes according to the method of the present disclosure. FIG. 12 shows a situation of a conventional paper reading medium that the reading position of the reader person to the article is determined according to the movement of the reading area VA in the reading object (i.e., a book in the embodiment). FIG. 13 shows another situation that the reading position is determined by the application protocol in the reading device. In this situation, it is easier to locate reading position of the reader person. For example, the current reading area is directly from the screen SC, and the specific position in the article can be identified according to the section break symbol "br" and the end symbol "ed".

Figure 14:
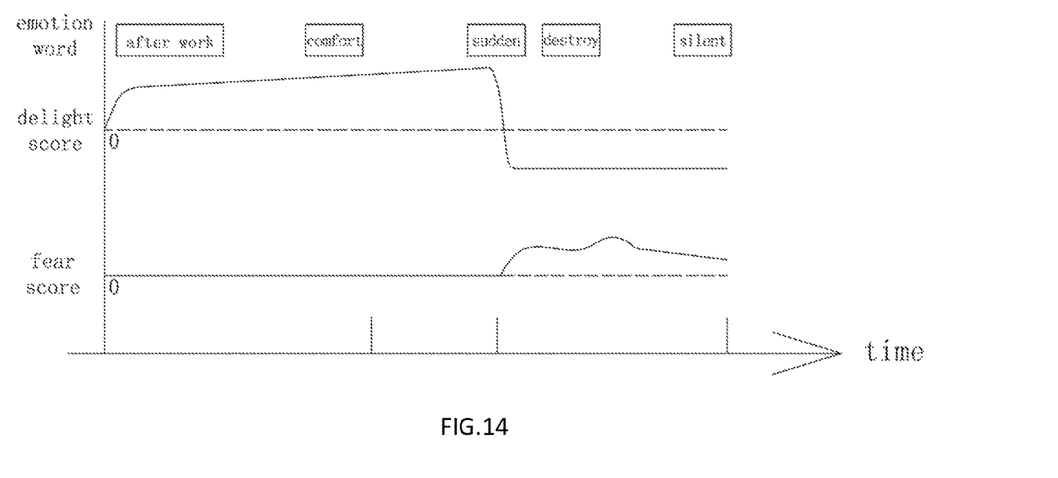
FIG. 14 is a diagram showing a process of generating an emotional time node in an embodiment of the method according to the present disclosure.
Figure 15:
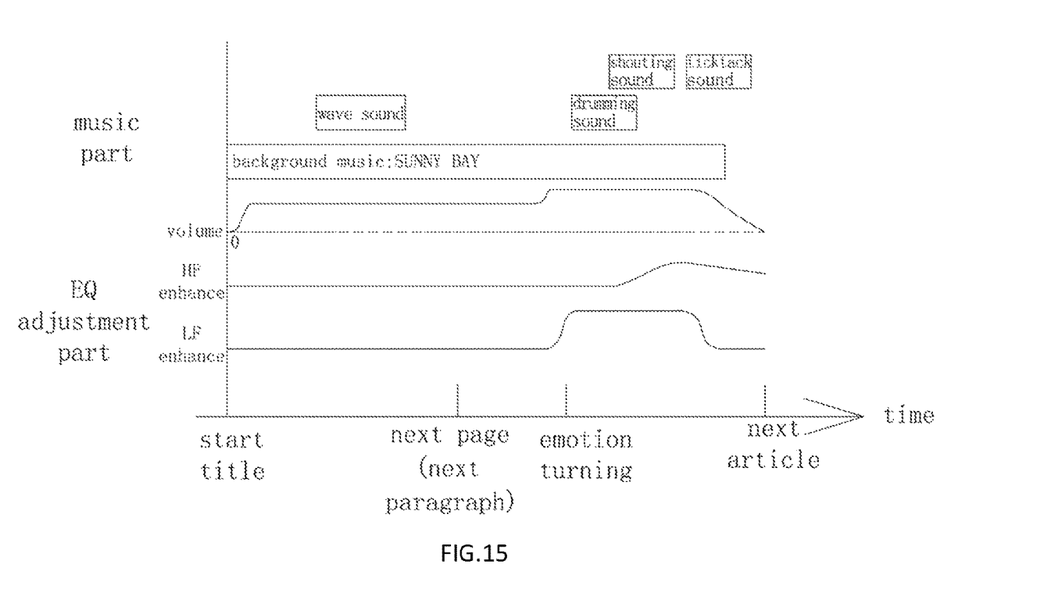
FIG. 15 shows a schematic illustration of audio synthesis based on reading time nodes and emotional time nodes and based on time domain superposition in an embodiment.

FIG. 14 shows generating emotional time nodes according to the method in the present disclosure. The time node is arranged according to the location of the identified keyword in the article, and the emotion turning nodes are defined as the cumulative value of the emotional score of each word exceeding a preset threshold. Subsequently, the audio synthesis can be performed according to the reading time nodes and the emotional time nodes, by means of the time domain superposition. As shown in FIG. 15, according to different emotions, the corresponding music of sound effect retrieved in the library of music material can be synthesized to the background music. For example, a sound of drum beats is added to support the tension in the event of panic. Further, the EQ (equalizer) can be adjusted to enhance the high or low frequency for a more powerful effect.

It should be recognized that embodiments of the present disclosure can be implemented or embodied via computer hardware, a combination of both hardware and software, or by computer instructions stored in a non-transitory computer-readable memory. The methods can be implemented in computer programs using standard programming techniques-including a non-transitory computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

Further, methodologies may be implemented in any type of computing platform that is operatively connected to a suitable tomography data scanning device, including but not limited to, personal computers, mini-computers, mainframes, workstations, networked or distributed computing environments, computer platforms separate, integral to, or in communication with charged particle tools or other imaging devices, and the like. Aspects of the present disclosure may be implemented in machine readable code stored on a non-transitory storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. Moreover, machine-readable code, or portions thereof, may be transmitted over a wired or wireless network. The disclosure described herein includes these and other various types of non-transitory computer-readable storage media when such media contain instructions or programs for implementing the steps described above in conjunction with a microprocessor or other data processor. The disclosure also includes the computer itself when programmed according to the methods and techniques described herein.

The above are only a preferred embodiments for the present disclosure, and the present disclosure is not limited to the above-described embodiments. As long as the technical effects of the present disclosure are achieved by the same means, it should fall within the scope of protection of the present disclosure. Various modifications and changes can be made to the technical solutions and embodiments within the scope of the disclosure.

The invention claimed is:

1. A reading environment sound enhancement system based on image processing and semantic analysis, comprising:

an image acquisition device for acquiring a reading image of a user, and a processing device having an operation unit for respectively controlling a transmission unit, a memory unit and an audio unit, and for performing transmission, storage and audio synthesis, wherein the operation unit comprises:

an image extraction module configured to receive an input signal of the image acquisition device, and to convert the image into an image signal;

a word recognition module configured to process the image signal for clear and easy recognition, to identify at least one word from the image signal, to store the recognized word in a cached text file, and to classify the words in the text file;

a semantic analysis module configured to identify the semantics of the classified word, to extract environmental semantic words and emotional semantic words respectively, and to retrieve an environmental background music or an emotional background music by comparing the environmental semantic words or the emotional semantic words to an element in a background music library; and an audio synthesis module for audio synthesis and sound enhancement on the basis of background music, comprising:

a time domain recorder for recording at least one reading time node according to a text change in a reading target area of the acquired image, recording at least one emotional time node if the accumulated emotional score value exceeds a preset threshold, each emotional time node corresponding to a position of the emotional word in a text segment, and generating a time domain control bar by integrating the reading time node and the emotional time node; and a mixer for superimposing audio signals of the background music and the sound effect music in time domain by a saturator having an attenuation factor, by means of the time domain control bar.

2. The system of claim 1, wherein the image acquisition device comprises a camera and/or a text capturing tool of a smart reading device, and the text capturing tool comprises a screenshot tool, a text memory reading tool or a invoking tool of an application programming interface (API) for a reading application.

3. The system of claim 1, wherein the image acquisition device is attached to an earphone, glasses or a wearable device of the user by at least one accessory.

4. The system of claim 3, further comprising a second operation unit disposed in the image acquisition device, wherein the second operation unit comprises:

an image preprocessing module configured to perform calibration of a reading target area on the captured image, and to perform interception, correction, denoising, and binarization processing for the image in the reading target area; and a transmission module configured to compress and wirelessly transmit the preprocessed image.

5. The system of claim 1, wherein the semantic analysis module comprises:

a word slicer configured to invoke a statistical language model to divide at least one word in a text segment, and to calculate a weight value and an emotion score for each divided word;

a topic model solver configured to calculate an optimal solution of an implicit Dirichlet LDA topic model by a random sampling method to represent a classification of each divided word; and a word feature extractor configured to classify the words in a text string and to distinguish the environmental words and the emotional words in the text string.

6. The system of claim 1, further comprising a second operation unit disposed in the image acquisition device, wherein the second operation unit comprises:

an image preprocessing module configured to perform calibration of a reading target area on the captured image, and to perform interception, correction, denoising, and binarization processing for the image in the reading target area; and a transmission module configured to compress and wirelessly transmit the preprocessed image.

7. A reading environment sound enhancement method based on image processing and semantic analysis, comprising the steps of:

providing a semantic knowledge base comprising a background semantic set, the background semantic set comprising an environment semantic set and an emotional semantic set, each of the environmental semantic set and the emotional semantic set comprising condition words;

receiving an input signal and converting image information from the input image signal including a screenshot in an electronic device or a page shooting image of a paper book;

processing the image signal for clear and easy recognition, identifying at least one word from the image signal, storing the recognized word in a cached text file, and classifying the word in the text file;

identifying the semantics of the classified word, and extracting environmental semantic words and emotional semantic words respectively;

retrieving an environmental background music and an emotional background music by comparing the environmental semantic words or the emotional semantic words to an element in a background music library;

performing audio synthesis and sound enhancement on the basis of background music;

recording at least one reading time node according to a text change in a reading target area of the acquired image, and recording at least one emotional time node if the accumulated emotional score value exceeds a preset threshold, each emotional time node corresponding to a position of the emotional word in a text segment;

generating a time domain control bar by integrating the reading time node and the emotional time node;

superimposing audio signals of the background music and the sound effect music in time domain by a saturator having an attenuation factor, by means of the time domain control bar; and playing the synthesized audio by the audio output device.

8. The method of claim 7, wherein processing the image signal comprises image correction and denoising; and identifying at least one word comprises text refinement, connected domain digitization, and line segment linearization.

9. The method of claim 7, wherein retrieving an environmental background music and an emotional background music comprises:
- invoking a statistical language model to divide at least one word in a text segment, and calculating a weight value and an emotion score for each divided word;
- calculating an optimal solution of an implicit Dirichlet LDA topic model by a random sampling method to represent a classification of each divided word;
- classifying the words in a text string, and distinguishing the environmental words and emotional words in the text string; and
- matching a music material to each divided word with a condition word.

10. The method of claim 7, further comprising:
- determining a reading position of the reader according to a movement of the reading area on a paper book during identifying to the page shooting image; and
- updating the reading position according to an identified movement of page turning.

11. The method of claim 7, further comprising:
- determining a reading position of the reader according to data of a reading software in the reading device; and
- locating a position of the text change in a reading article by means of a section break symbol or an end symbol of a paragraph.

* * * * *